United States Patent
Sharma et al.

[11] Patent Number: 6,081,355
[45] Date of Patent: Jun. 27, 2000

[54] MULTI-WAVELENGTH LIGHT SOURCE

[75] Inventors: Manish Sharma, Kawasaki; Mitsuru Sugawara, Tokyo, both of Japan

[73] Assignee: Kabushiki Kaisha Toshiba, Kawasaki, Japan

[21] Appl. No.: 08/813,590

[22] Filed: Mar. 7, 1997

[30] Foreign Application Priority Data

Mar. 8, 1996 [JP] Japan ................................. 8-052017

[51] Int. Cl.[7] ....................................... H04J 14/02
[52] U.S. Cl. ........................ 359/110; 359/124; 359/132; 359/133
[58] Field of Search ................................. 359/110, 124, 359/132, 133, 187, 156; 372/8

[56] References Cited

U.S. PATENT DOCUMENTS

| | | | |
|---|---|---|---|
| 5,400,164 | 3/1995 | Kurtzke et al. | 359/156 |
| 5,574,739 | 11/1996 | Carruthers et al. | 372/29 |
| 5,781,669 | 7/1998 | Schmid et al. | 385/7 |
| 5,850,491 | 12/1998 | Morasca et al. | 385/7 |
| 5,878,065 | 3/1999 | Delavaux | 372/18 |
| 5,923,683 | 7/1999 | Morioka et al. | 372/6 |

OTHER PUBLICATIONS

Mahon et al. "Polarization Allocation Schemes for Minimizing Fiber Four–Wave Mixing Crosstalk in Wavelength Division multiplexed optical Communication System.", IEEE Photonics, vol. 8, No. 4, pp. 575–577, Apr. 1996.

Govind P. Argawal. Nonlinear Fiber Optics, Chapter 10, (pp. 302–303), 1989.

T. Morioka, et al. "Multiwavelength Picosecond Pulse Source with Low Jitter and High Optical Frequency Stability Based on 200nm Supercontinuum Filtering", Electronic Letters, vol. 31, No. 13, (pp. 1064–1066), Jun. 22, 1995.

*Primary Examiner*—Jason Chan
*Assistant Examiner*—Dalzid Singh
*Attorney, Agent, or Firm*—Oblon, Spivak, McClelland, Maier & Neustadt, P.C.

[57] ABSTRACT

An optical pulse train generated by an optical pulse generator and an oscillator is coupled into a polarization switcher to polarize two successive pulses perpendicular to each other. The optical pulse train is amplified by an EDFA, then entered into an SC fiber so that the optical spectrum is broadened. The optical pulse train output from the SC fiber is then directed to an optical wavelength demultiplexer for demultiplexing into components of desired wavelengths. In this case, since successive pulses are polarized perpendicular to each other, there is no need to use polarization maintaining fiber for the SC fiber and for connection optical modulator. In particular, if the polarization made dispersion of the SC fiber is sufficiently small, the SC pulses polarized perpendicular to each other will not overlap or be superimposed upon each other in time domain. Thus, the time-averaging degree of polarization can be held zero and non-polarized wideband white pulses can be obtained.

13 Claims, 11 Drawing Sheets

MULTI-WAVELENGTH LIGHT SOURCE

BACKGROUND OF THE INVENTION

1. Field of the Invention

The present invention relates to a multi-wavelength light source for use in, for example, an optical wavelength division multiplexing communications system and generating a plurality of optical carriers of different wavelengths.

2. Discussion of the Background

In general, conventional optical wavelength division multiplexing communications systems use a plurality of optical carriers of different wavelengths. Each optical carrier is generated by a separate laser diode. Recently, it was demonstrated that the use of a supercontinuum (SC) and a wavelength separator allows a plurality of optical carriers of different wavelengths to be generated (Electronics Letters, vol. 31, pp. 1064–1066, 1995). The arrangement shown in the paper is shown in FIG. 1.

Figure 1:
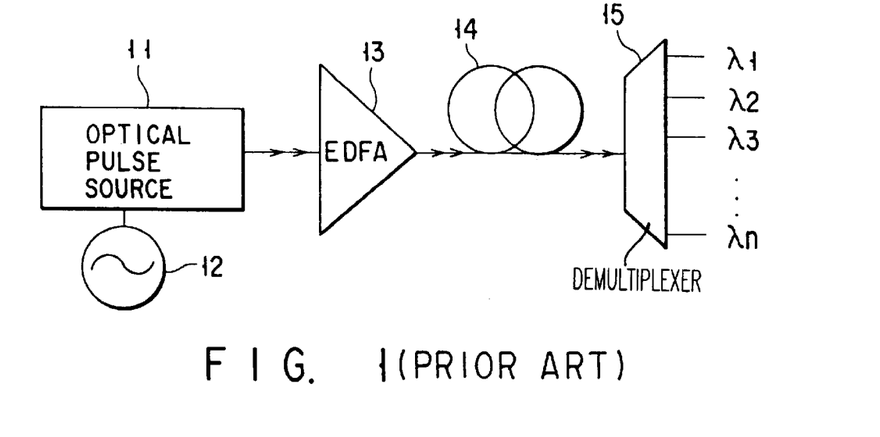
FIG. 1 is a block diagram of a conventional multi-wavelength light source.

In FIG. 1, an optical pulse source 11 uses a mode-locked fiber ring laser. This produces a train of optical pulses having a pulse duration of 3.5 ps and a repetition rate of 6.3 GHz.

The optical pulse train is amplified by an erbium doped fiber amplifier (EFDA) 13 so that its peak power reaches about one watt and then introduced into a zero dispersion fiber (SC fiber) 14 that is three kilometers long.

Figure 2A:
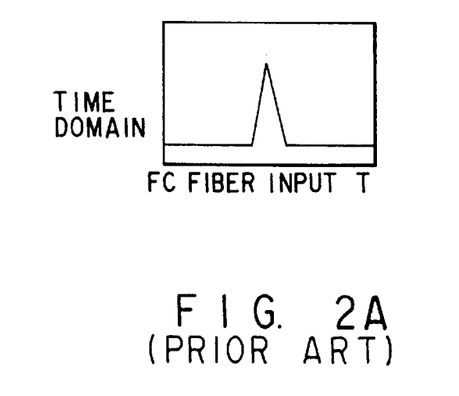
FIGS. 2A and 2B are diagrams showing spectra of input and output pulses of the SC fiber in terms of time domain.
Figure 2B:
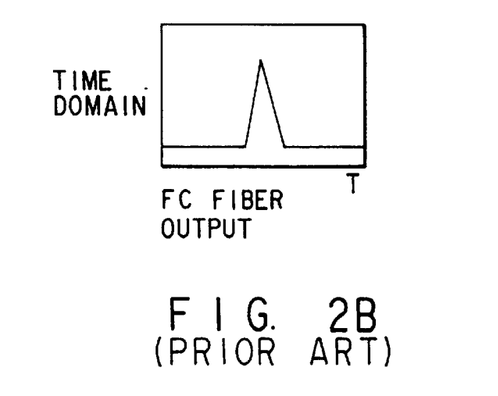
Figure 2C:
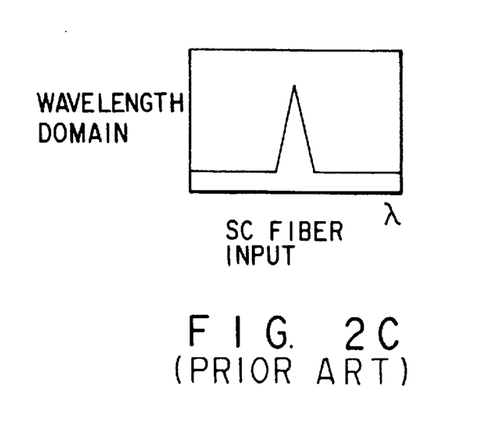
FIGS. 2C and 2D are diagrams showing spectra of input and output pulses of the SC fiber in terms of wavelength domain.
Figure 2D:
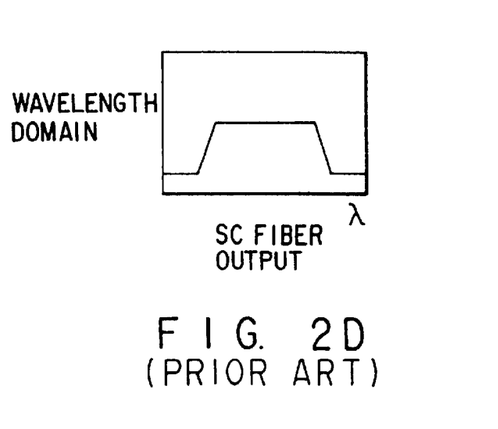

At this point, the spectrum of the optical output of the SC fiber 14 is broadened to as wide as 200 nm by its nonlinearity. This will be described with reference to FIGS. 2A through 2D. FIGS. 2A and 2B respectively show the spectra of input and output pulses of the SC fiber in terms of time domain, while FIGS. 2C and 2D respectively show the spectra of input and output pulses of the SC fiber in terms of wavelength domain.

As shown in FIGS. 2A through 2D, when extremely short optical pulses travel through a nonlinear medium (for example, a dispersion shift fiber), self phase modulation (SPM) occurs, resulting in the generation of a supercontinuum. In this case, the use of pulses having a high peak power causes SPM to occur strongly, allowing the spectrum to be broadened increasingly (refer to "Nonlinear Fiber Optics" by Agrawal).

The use of an optical pulse train having a small duty cycle and a pulse width of the order of a few picoseconds allows an optical amplifier (for example, EDFA) to achieve a peak power of the order of some watts. Further, by passing the optical pulse train through a dispersion shifted fiber, the spectrum width can be broadened to some tens of nanometers. Thus, by extracting a portion of the SC spectrum by means of a wavelength demultiplexer or filter, the extracted portion can be utilized as carriers.

The SC spectrum is composed of components spaced by a frequency that is the same as the pulse repetition frequency. Thus, by extracting a portion of the entire spectrum by means of a wavelength demultiplexer, a plurality of components can be extracted. In terms of time domain, the extracted signal is a pulse train as shown in FIGS. 2A and 2B. Of course, the use of a very narrow filter will make it possible to extract a single component. The wider bandwidth the filter has, the narrower the pulse width will be.

The optical pulse train having its spectrum broadened by the SC fiber 14 in that manner is input into an array waveguide WDM demultiplexer 15. The demultiplexer 15 extracts multiple optical pulse trains λ1 to λn having different wavelengths from the SC spectrum of the optical pulse train entered. These pulse trains λ1 to λn are each utilized as an optical carrier.

In the above paper, it is shown that 16 pulse trains spaced by one nanometer in wavelength were generated for use as optical carriers and could be transmitted modulated with data.

However, the conventional multi-wavelength light source arranged as described above has a problem that it is affected by the polarization dependence of an optical modulator. That is, a conventional optical modulator can modulate only optical in a certain plane of polarization. It is therefore required to match the plane of polarization of input light to that plane of polarization. When the above-described multi-wavelength light source is used, therefore, it is required that the mode-locked fiber laser, the EDFA, the dispersion shift fiber, the WDM multiplexer/demultiplexer, the optical modulator, and optical fibers that connect these components be of the polarization-maintaining type.

In the use of polarization maintaining fibers, problems arise in that they not only cost tens of times more than usual fibers but also are difficult and costly to connect. In terms of performance as well, a problem arises in that the polarization extinction ratio goes low.

When the fibers extend one kilometer or more, their performance (polarization extinction ratio) will reduce. Even if polarization maintaining fibers are used, therefore, the plane of polarization will not be held after all, causing variations in peak level in the optical modulator.

With the multi-wavelength light source, the optical fibers causes the nonlinear effect, requiring very high-power light. In order to achieve a high average power, it is required to use an EDFA. It is pump power which can be coupled to an optical fiber that limits the average output power of the EDFA.

By amplifying an optical pulse train having a narrow pulse width and a low repetition frequency in place of continuous light by means of EDFA, an optical pulse train of significantly high peak power can be generated. Since at least one pulse is required to send each bit of data, the maximum allowable bit rate is equal to the pulse repetition frequency. In the use of an optical pulse train that is low in repetition frequency as an optical carrier, therefore, the maximum allowable bit rate will also be limited.

BRIEF SUMMARY OF THE INVENTION

It is an object of the present invention to provide a multi-wavelength light source which permits supercontinuum generation using a simple and low-cost technique.

A multi-wavelength light source of the invention comprises: optical pulse train generating means for generating an optical pulse train; polarization control means for controlling each pulse in the optical pulse train so that successive optical pulses are orthogonal polarized to each other; optical amplifier means for amplifying the optical pulse train output from the polarization control means; optical spectrum broadening means for broadening the optical spectrum of the optical pulse train amplified by the optical amplifier means; and optical wavelength demultiplexing means for demultiplexing the optical spectrum into components of desired wavelengths.

The polarization control means comprises a polarization dependent phase modulator for phasemodulating the light passing through an optical waveguide by coupling an electric field to the light waveguide in accordance with a drive signal; an optical pulse train applying means for applying an optical pulse train generated by the optical pulse train generating means, to an input port of the optical waveguide such that the optical pulses are polarized at 45 degrees to axes which the optical waveguide has in TE mode and TM mode; and switching means for supplying a drive signal to apply a different electric field to the phase modulator for each optical pulse passing through the optical waveguide, thereby to polarize the optical pulses output from the phase modulator, in different directions.

Alternatively, the polarization control means includes distribution means for distributing the optical pulse train to two paths, delay/polarization plane control means for delaying an optical pulse train on one of the two paths by one-half of the pulse period relative to an optical pulse train on the other path and rotating the plane of polarization of one pulse train through 90 degrees, and multiplexing means for multiplexing optical pulse trains from the delay/polarization plane control means.

Alternatively, the polarization control means uses a polarization maintaining fiber having two polarization modes of fast and slow modes and a length that allows the difference in propagation delay between the two modes to be one-half of the pulse period of the optical pulse train being coupled in to the two polarization modes with the same power.

The optical spectrum broadening means uses a dispersion shifted fiber having a nonlinear property.

Another multi-wavelength light source of the invention comprises: optical pulse train generating means for generating an optical pulse train; optical amplifier means for amplifying the optical pulse train output from the polarization control means; optical spectrum broadening means for broadening the optical spectrum of the optical pulse train amplified by the optical amplifier means; multiplier means for multiplying the pulse repetition frequency of the optical pulse train output from the optical spectrum broadening means; and optical wavelength demultiplexing means for demultiplexing the optical pulse train output from the optical spectrum broadening means into components of desired wavelengths.

The multiplying means repeats an operation of distributing the optical pulse train to two paths, delaying an optical pulse train on one path by one-half of the pulse period relative to an optical pulse train on the other path, and multiplexing the two optical pulse trains together.

Alternatively, the multiplying means distributes the optical pulse train to a number N of paths (where N is a natural number of more than one), delays optical pulse trains on the N paths by 0, T/N, 2T/N, 3T/N, . . . , (N−1)T/N (where T is the pulse period), respectively, and multiplexes the optical pulse trains on the N paths together.

Alternatively, the multiplying means uses a star coupler for multiplex processing, and the optical wavelength separator includes a plurality of wavelength separators to which each optical pulse train output from the star coupler is directed.

Still another light source of the invention comprises: a laser light source for outputting laser light; modulation means for directly pulse modulating the laser light source to provide an optical pulse train; pulse width control means for narrowing the pulse width of each pulse in the optical pulse train output from the laser light source; an optical amplifier for amplifying the optical pulse train output from the pulse width control means; spectrum broadening means for broadening the optical spectrum of the optical pulse train amplified by the optical amplifier; and optical wavelength multiplexing means for demultiplexing the optical pulse train output from the optical spectrum broadening means into components of desired wavelengths.

The pulse width control means uses an electro-absorption modulator which is driven in synchronization with the laser light source.

A further multi-wavelength light source of the invention comprises: first and second optical pulse generating means for respectively generating first and second optical pulse trains having the same pulse period; a 2×2 coupler for multiplexing the first and second optical pulse trains together and distributing a multiplexed optical pulse train to two paths; pulse spacing control means for monitoring a multiplexed optical pulse train on one of the paths and controlling either one of the first and second optical pulse generating means so that the pulse spacing in the multiplexed optical pulse train corresponds to one half of the pulse period of the first and second optical pulse trains; optical amplifier means for amplifying a multiplexed optical pulse train on the other of the paths; spectrum broadening means for broadening the optical spectrum of the optical pulse train amplified by the optical amplifier; and optical wavelength demultiplexing means for demultiplexing the optical pulse train output from the optical spectrum broadening means into components of desired wavelengths.

Another multi-wavelength light source of the invention comprises: first and second optical pulse generating means for respectively generating first and second optical pulse trains having the same pulse period; first and second optical amplifier means for respectively amplifying the first and second pulse trains; first and second optical spectrum broadening means for respectively broadening the optical spectra of the optical pulse trains amplified by the first and second optical amplifier means; a 3-dB coupler for multiplexing the first and second optical pulse trains output from the first and second optical spectrum broadening means and distributing a multiplexed optical pulse train to paths; pulse spacing control means for monitoring a multiplexed optical pulse train on one of the paths and controlling either one of the first and second optical pulse generating means so that the pulse spacing in the multiplexed optical pulse train corresponds to one half of the pulse period in the first and second optical pulse trains; and optical wavelength demultiplexing means for demultiplexing a multiplexed optical pulse train on the other path from the 3-dB coupler into components of desired wavelengths.

In the conventional multi-wavelength light source, input and output beams of light of an SC fiber are polarized, but the state of polarization varies with ambient temperature and so on. For this reason, when optical output of the fiber is directed to an optical modulator through a filter, the power level of output optical of the modulator fluctuates. The use of polarization maintaining fibers for all the paths increases cost and, when the paths are long, the polarization extinction ratio of the polarization maintaining fibers drops. Thus, the effectiveness of the polarization maintaining fiber is limited.

In the present invention, on the other hand, successive optical pulses in an optical pulse train generated by an optical pulse generator are orthogonally polarized, to each other, this eliminates the need of replacing a fiber connecting the SC fiber and the optical modulator with a polarization maintaining one. In particular, if the fiber polarization dispersion is sufficiently small, SC pulses perpendicular to each other in the direction of polarization will not coincide with each other in time domain. Thus, the time-averaged degree of polarization can be held zero.

Here, directing a portion of the SC spectrum to an optical modulator through a filter allows only light polarized in a certain direction to pass through the optical modulator. Thus, if the planes of polarization of optical pulses are perpendicular to each other, half the light power will certainly pass through the optical modulator no matter how the state of polarization of incident light rotates. This eliminates amplitude variations. However, the bit rate is limited to one-quarter the pulse repetition frequency.

As a result, the use of an electric filter having a usual optimum bandwidth for reception will allow the modulated optical pulse train to be demodulated without need for special signal processing.

Specifically, the state of polarization of the output of a mode locked fiber laser or other sources of short pulses of light is fixed usually. In the present invention, use is made of a high-speed polarization modulator and a polarization switch to polarize two successive optical pulses perpendicular to each other, i.e., to subject the optical pulse train to polarization scrambling. In this case, a control signal used for polarization switching is synchronized with the optical pulses.

As another method of polarization scrambling of an optical pulse train, an optical pulse train is distributed to two paths, the plane of polarization of each pules in the optical pulse train on one path is rotated through 90 degrees and the optical pulse train is delayed by one-half the pulse period and the optical pulse trains on the two paths are then multiplexed together. Since the two successive pulses in the multiplexed optical pulse train are polarized perpendicular to each other, the average degree of polarization can be made zero.

By allowing the optical pulse train subjected to polarization scrambling to pass through a dispersion shifted fiber (of non-polarization maintaining type) having a length of several kilometers, non-polarized supercontinuum can be produced.

In order to achieve significant spectral broadening, it is required to obtain a high peak power. To this end, it is better to lower the pulse repetition frequency since this allows a higher peak power to be achieved for the same average power level. In order to send data at high bit rate, however, it is required to increase the pulse repetition frequency.

Then, according to the invention, to eliminate the trade-off, a wideband SC spectrum of a high repetition frequency is produced by first generating an optical pulse train which is low in pulse repetition frequency and high in peak power, then broadening its spectrum, and finally multiplying the pulse repetition frequency of the optical pulse train by means of optical time-division multiplex processing.

Specifically, the SC optical pulse train is distributed to two paths. The optical pulse train on one path is delayed by one-half the pulse period and then multiplexed with the optical pulse train on the other path. By repeating these operations, the pulse repetition frequency can be multiplied.

Alternatively, the optical pulse train having the SC spectrum width broadened is distributed to a number N of paths (where N is a natural number of more than one). The optical pulse trains on the N paths are delayed by 0, T/N, 2T/N, 3T/N, . . . , (N−1)T/N (where T is the pulse period), respectively, and then multiplexed together, thereby allowing the pulse repetition frequency to be multiplied. In this case, a star coupler is used for multiplex processing and multiple identical outputs are available, each of which can be directed to an optical wavelength demultiplexer, thereby allowing a large number of optical carriers of different wavelengths to be obtained.

The bandwidth of the resulting SC spectrum depends on the peak power and the spectrum width of the original optical pulse train. Thus, the use of pulses wide in spectrum width allows sufficient spectrum broadening to occur with pulses lower in power. If a directly-modulated laser is used to produce the optical pulse train, the spectrum of the pulses will be broadened by wavelength chirp.

By the direct pulse modulation of a laser light source and the use of, for example, an electro-absorption modulator to narrow the pulse width, the spectrum of the final optical pulse train can be further broadened by wavelength chirp.

By providing a redundant optical pulse generator, the reliability can be increased. In this case, a redundant optical amplifier and optical spectrum broadening means may be provided.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention, in which.

DETAILED DESCRIPTION OF THE INVENTION

Figure 3:
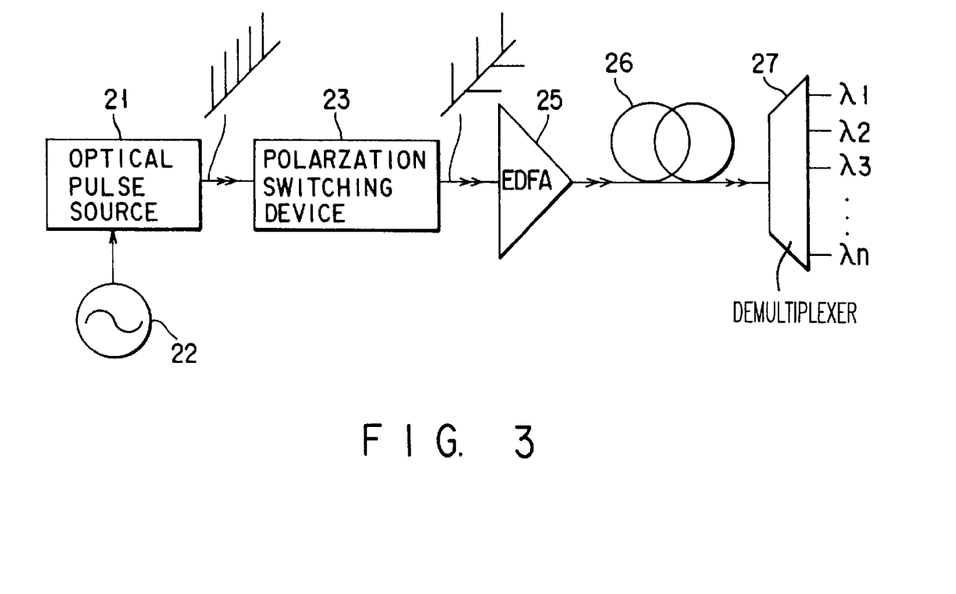
FIG. 3 is a block diagram of the most basic arrangement for a multi-wavelength light source according to a first embodiment of the present invention.

Referring now to FIG. 3 there is shown the most basic arrangement as a first embodiment of a multi-wavelength light source in accordance with the present invention, in which an optical pulse generator 21 generates an optical pulse train in response to a frequency signal from an oscillator 22. The optical pulse train is in turn applied to a polarization switching unit 23, which switches the optical pulses in the train alternately into two states of polarization that are orthogonal to each other, thereby achieving polarization scrambling. The optical pulse train thus subjected to polarization scrambling by the polarization switching unit is passed through an SC fiber 26, thereby producing non-polarized SC spectrum.

According to this arrangement, therefore, since the input optical pulse train to the EDFA 25 can be scrambled in polarization, multiple wavelength components λ1 to λn separated by a wavelength demultiplexer 27 are all non-polarized. Thus, the use of these light components as optical carriers for optical modulators will eliminate the polarization dependence problem.

Figure 4:
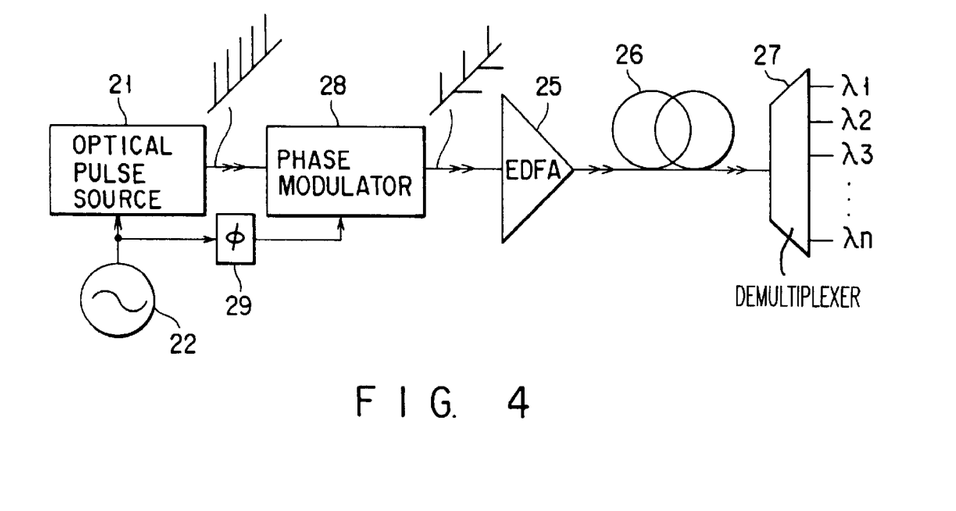
FIG. 4 is a block diagram of a multi-wavelength light source according to a second embodiment of the present invention.

FIG. 4 shows a second embodiment of the multi-wavelength light source according to the present invention, which is characterized by the use of a phase modulator 28 and a variable phase shifter 29 as the polarization switching unit of FIG. 3. In other respects, the arrangement of FIG. 4 is the same as that of FIG. 3. Thus, in FIG. 4, like reference numerals are used to denote corresponding parts to those in FIG. 3 and repeated descriptions are omitted herein.

In FIG. 4, the optical pulse generator 21 comprises, for example, a mode-locked fiber laser. The optical pulse generator is driven by the oscillator 22 to provide an optical output in the form of pulses. The optical pulse train thus generated is coupled into, for example, an LiNbO3 phase modulator 28 so that each pulse will become perpendicular in plane of polarization to the next.

Figure 5A:
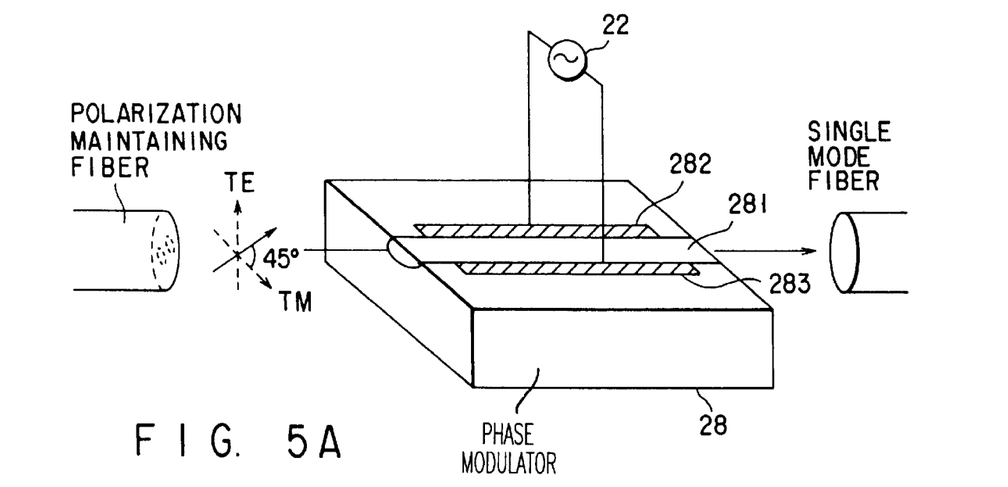
FIGS. 5A and 5B are perspective view and side view of the phase modulator used in the second embodiment.
Figure 5B:
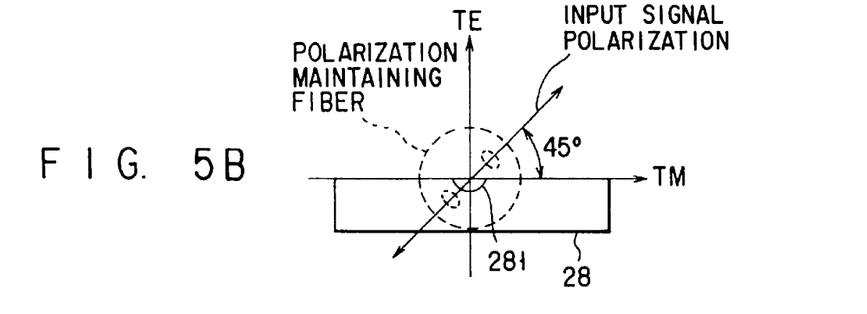

More specifically, as shown in FIG. 5A, the optical pulse train generated by the optical pulse generator 21 is transmitted over a polarization maintaining fiber and directed to an input port of the optical waveguide 281 of the phase modulator 28. At this time, as shown in FIG. 5B, the polarization maintaining fiber is rotated so that the direction of polarization is 45 degrees with respect to each of axes of the TE mode and the TM mode of the phase modulator waveguide. Thereby, the optical pulse train is coupled to the optical waveguide 281 so that it couples equally into the TE mode and the TM mode.

In this state, the output of the oscillator 22 is applied to a pair of electrodes 282 and 283 formed on the opposite sides of the optical waveguide 281 with its phase adjusted by a variable phase shifter 29. At this point, since the phase difference between the TE and TM modes in the phase modulator 23 varies with the voltage applied, the states of polarization of the output light can be varied.

If, by driving the phase modulator 23 with a sinusoidal wave of proper phase, frequency, and amplitude from the phase shifter 29, the optical pulses are controlled so that each pulse is perpendicular in plane of polarization to the next one, then polarization scrambling can be implemented in an efficient manner. The polarization-scrambled optical pulse train thus obtained is amplified by an EDFA 25 and then introduced into an SC fiber 26 as is the case with the conventional technique. Thereby, a non-polarized SC spectrum is produced.

According to this embodiment, therefore, since the input optical pulse train to the EDFA 25 can be scrambled in polarization, multiple wavelength components λ1 to λn separated by a WDM demultiplexer 27 each become non-polarized. Thus, the use of these optical components as optical carriers for optical modulators will eliminate the polarization dependence problem.

Figure 6:
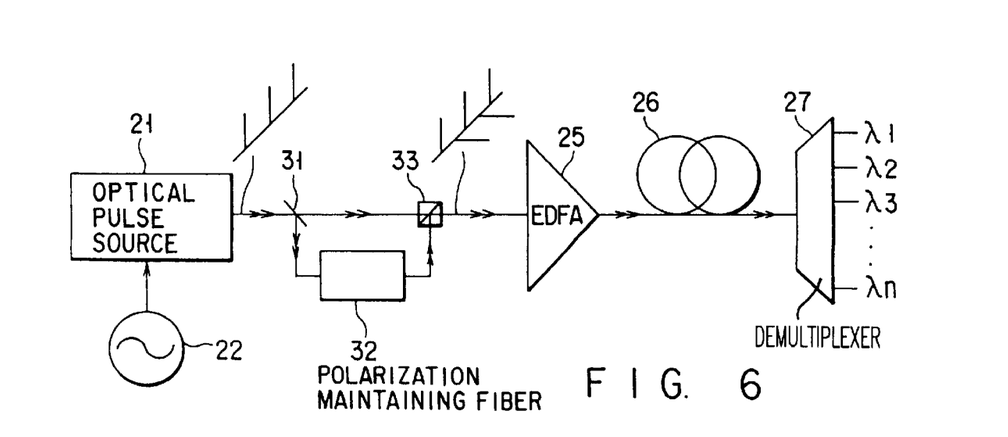
FIG. 6 is a block diagram of a multi-wavelength light source according to a third embodiment of the present invention.

FIG. 6 shows a third embodiment of the multi-wavelength light source in accordance with the present invention. This embodiment is characterized by the use of first and second optical beam splitters 31 and 33 and a polarization maintaining fiber 32 as the polarization switching unit. In other respects, this embodiment remains unchanged from the arrangement of FIG. 3. Thus, in this figure, like reference numerals are used to denote corresponding parts to those in FIG. 3 and repeated descriptions thereof are omitted herein.

In the multi-wavelength light source of this embodiment, an optical pulse train output from the optical pulse generator 21 is distributed to two paths by the first polarization beam splitter (PBS) 31. One of the paths leads through a polarization maintaining fiber 32 of moderate length, whereby the corresponding optical pulse train is delayed by one-half the pulse period. The optical pulse train passing through that fiber and the optical pulse train traveling through the other path are multiplexed together by a second PBS 33.

At this point, the pulse repetition frequency of the multiplexed pulse train becomes doubled and two successive pulses become perpendicular to each other in plane of polarization. For this reason, the multiplexed light from the second PBS 33 is scrambled in polarization. The multiplexed light is in turn amplified by the EDFA 25 and then passed through the SC fiber 26, so that a non-polarized spectrum is obtained. The multiplexed light is then separated by the WDM demultiplexer 27 into multiple optical components λ1 to λn.

Therefore, this embodiment allows a non-polarized SC spectrum to be obtained readily by the use of a polarization maintaining fiber 32 of moderate length and two PBSs 31 and 33.

Figure 7A:
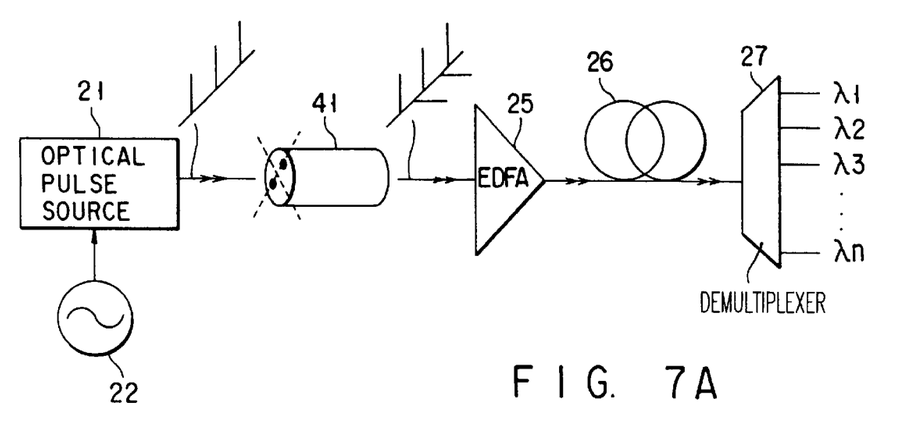
FIG. 7A is a block diagram of a multi-wavelength light source according to a fourth embodiment of the present invention.

FIG. 7A shows a fourth embodiment of the multi-wavelength light source according to the present invention. This embodiment is characterized by a polarization maintaining fiber 41 as the polarization switching unit. In other respects, this embodiment remains unchanged from the arrangement of FIG. 3. Thus, in this figure, like reference numerals are used to denote corresponding parts to those in FIG. 3 and repeated descriptions thereof are omitted herein.

Figure 7B:
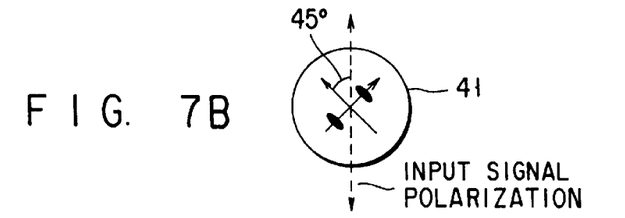
FIG. 7B is side view of a polarization maintaining fiber used in the multi-wavelength light source.

The multi-wavelength light source of this embodiment uses a polarization maintaining fiber 41 having a length of L. This fiber has two modes: fast mode and slow mode. An optical pulse train from the optical pulse generator 21 is coupled to the fiber 41 in the state where it is polarized in the direction of 45 degrees with respect to each of axes of the two modes as shown in FIG. 7B. For this reason, the optical pulse train is input equally into each of the fast and slow modes of that fiber. The output light is coupled into the EDFA 25.

The timing of the optical pulse train in each mode polarization are displaced gradually by the polarization dispersion effect of the fiber 41. By setting the length L of the polarization maintaining fiber 41 so that the optical pulse trains in the fast mode and the slow mode are displaced from each other by one-half the cycle period, the time-averaged degree of polarization can be reduced to zero.

Therefore, this embodiment permits a non-polarized SC spectrum to be obtained readily by simply using the polarization maintaining fiber 41 of proper length.

Figure 8:
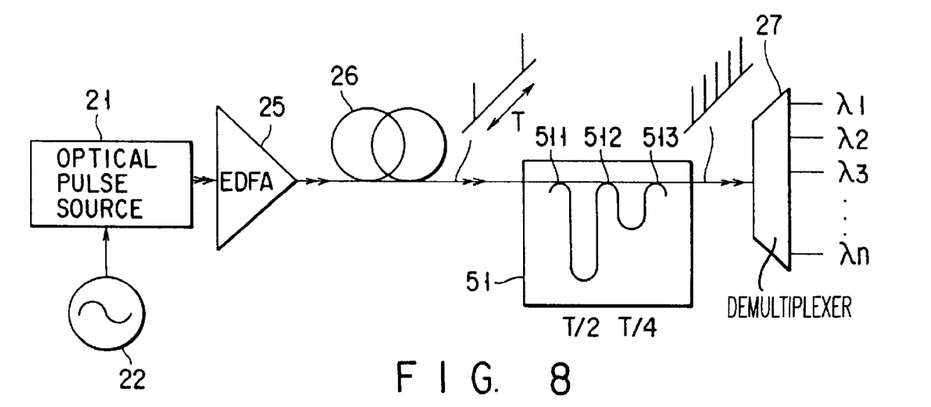
FIG. 8 is a block diagram of a multi-wavelength light source according to a fifth embodiment of the present invention.

FIG. 8 shows a fifth embodiment of the multi-wavelength optical source according to the present invention. This embodiment has no polarization switching unit and is characterized by the use of a multiplier 51. In other respects, this embodiment remains unchanged from the arrangement of FIG. 3. Thus, in this figure, like reference numerals are used to denote corresponding parts to those in FIG. 3 and repeated descriptions thereof are omitted herein.

In this multi-wavelength light source, a light output whose spectrum is extended by the SC fiber 26 is applied to the WDM demultiplexer 27 through the multiplier 51.

In the multiplier 51, an input optical pulse train (one cycle period is taken to be T) is distributed by a 3-dB coupler 511 to two paths. The optical pulse train on one of the paths is delayed by one-half the cycle period (=T/2) with respect to the optical pulse train on the other path. The optical pulse trains on both the paths are then multiplexed together by a 3-dB coupler 512, thereby increasing the pulse repetition frequency by a factor of two.

Subsequently, the optical pulse train is likewise distributed to two paths by the 3-dB coupler 512. The pulse trains on the two paths are multiplexed together by a 3-dB coupler 513 after the optical pulse train on one path has been delayed by one-half the cycle period (=T/4) with respect to the optical pulse train on the other path, thereby further increasing the pulse repetition frequency by a factor of two. In this way, the optical pulse train has its pulse repetition frequency quadrupled and then sent to the WDM demultiplexer 27.

In the arrangement of FIG. 8A, the number of frequency multiplying stages is selected to be two. By further increasing the number of such stages, higher pulse repetition frequency can be obtained.

According to this embodiment, therefore, even if an optical pulse train that is narrow in pulse width and low in pulse repetition frequency is amplified by the EDFA 25 to produce a high-peak-power optical pulse train, use can be made of a simple and low-cost technique of simply using multipliers to subject an optical pulse train to frequency multiplication. Thus, supercontinuum pulses that allow the transmission of data at a high bit rate can be produced.

At two output ports of the last 3-dB coupler 513 are obtained two optical pulse trains that have been subjected to frequency multiplication in substantially the same way. By inputting the two optical pulse trains to separate WDM demultiplexers two carriers for each wavelength can be efficiently obtained.

Figure 9:
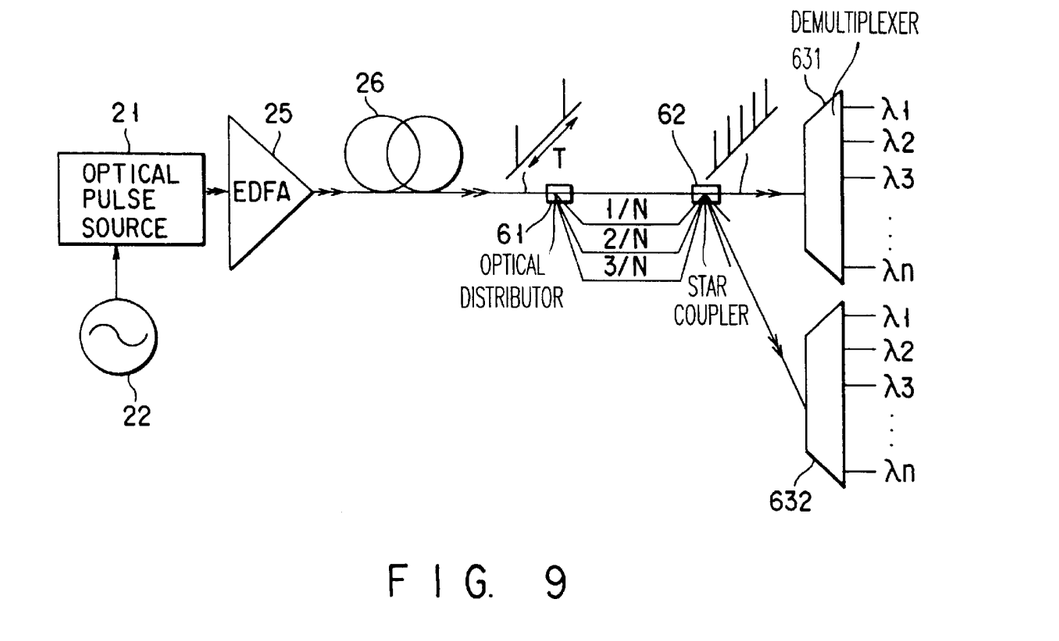
FIG. 9 is a block diagram of a multi-wavelength light source according to a sixth embodiment of the present invention.

FIG. 9 shows a sixth embodiment of the multi-wavelength light source according to the present invention. This embodiment has no polarization switching unit and is characterized by the use of an optical splitter 61, a star coupler 62 and multiple WDM demultiplexers (two in this example). In other respects, the arrangement of this embodiment is the same as that of FIG. 3. In this figure, like reference numerals are used to denote corresponding parts to those in FIG. 3 and repeated descriptions thereof are omitted herein.

Instead of using 3-dB couplers this multi-wavelength light source uses a one-to-N optical distributor 61 which distributes an optical pulse train to a number N of paths that provide relative delaying of the optical pulse trains by 0, T/N, 2T/N, 3T/N, . . . , (N−1)T/N (T=the pulse period and N=4 in the figure). The delayed pulse trains are multiplexed together by an N-to-N star coupler 62. Thereby, the pulse repetition frequency of the optical pulse train can be increased by a factor of N.

The multiplexing star coupler 62 has N output ports, thus permitting an optical pulse train to be sent over each of N paths. Light pulse trains on the respective paths can be applied to WDM demultiplexers 631 and 632 for demultiplexing into optical components of different wavelengths.

Of course, the arrangements shown in FIGS. 8 and 9 can be combined to obtain a desired number of paths and a desired multiplication factor by which the pulse repetition frequency of the optical pulse train is increased.

Figure 10:
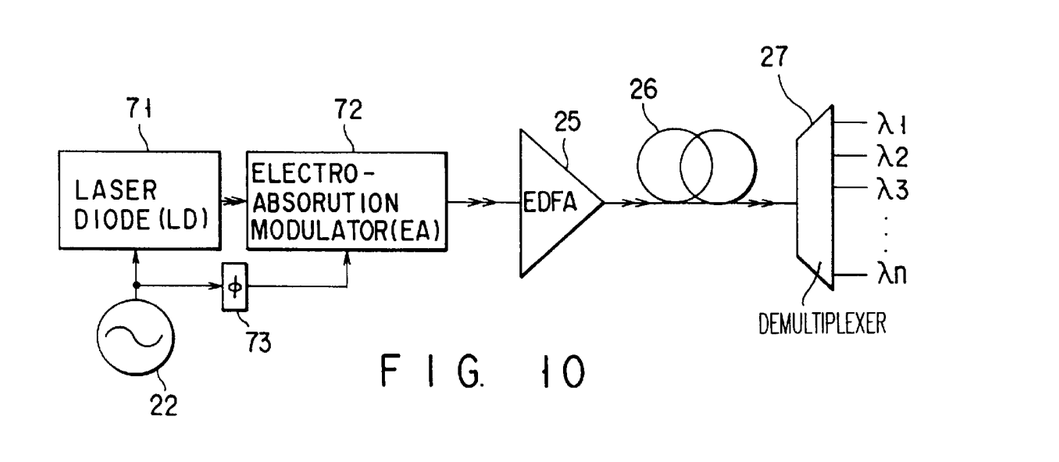
FIG. 10 is a block diagram of a multi-wavelength light source according to a seventh the present invention.

FIG. 10 shows a seventh embodiment of the multi-wavelength light source according to the present invention, which is characterized by the use of a laser diode 71 as the optical pulse generator and an electro-absorption modulator (EA) 72 and a variable phase shifter 73. In this respect, this embodiment remains unchanged from the arrangement of FIG. 3. In this figure, therefore, like reference numerals are used to denote corresponding parts to those in FIG. 3 and repeated descriptions thereof are omitted herein.

In this multi-wavelength light source, coherent light produced by a laser diode 71 is pulse modulated with an output of the oscillator 22, the modulated optical output is applied to the electro-absorption modulator 72 which is driven by an oscillator output phase-adjusted by the variable phase shifter 73, and the resulting optical output is input into the EFDA 25.

Figures 11A, 11B:
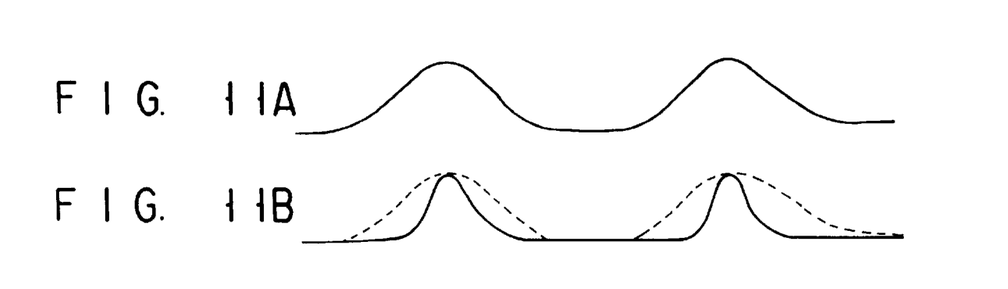
FIGS. 11A and 11B are spectrum waves of the resulting optical pulse train obtained by direct modulation and output a electro-absorption modulator.

When the laser diode 71 is subjected to direct modulation, the spectrum of the resulting optical pulse train becomes several times wider than the spectrum of an optical pulse train obtained by external modulation as shown in FIG. 11A. Thus, passing the SC spectrum obtained after transmission through a nonlinear medium will also be several times wider.

By driving the electro-absorption modulator 72 with a signal having synchronized with the direct modulation signal applied to laser diode, the pulse width of each pulse in the optical pulse train can be made narrower and also suppress jitter and noise as shown in FIG. 11B.

According to the arrangement, therefore, the pulse width of each pulse in the optical pulse train can be made extremely narrow and the spectrum of the optical pulse train can be made sufficiently wide, thus achieving high peak power when the pulse train passed through the EFDA 25. Thereby, a supercontinuum that allow data transmission at high bit rate can be produced readily and at low cost.

Figure 12:
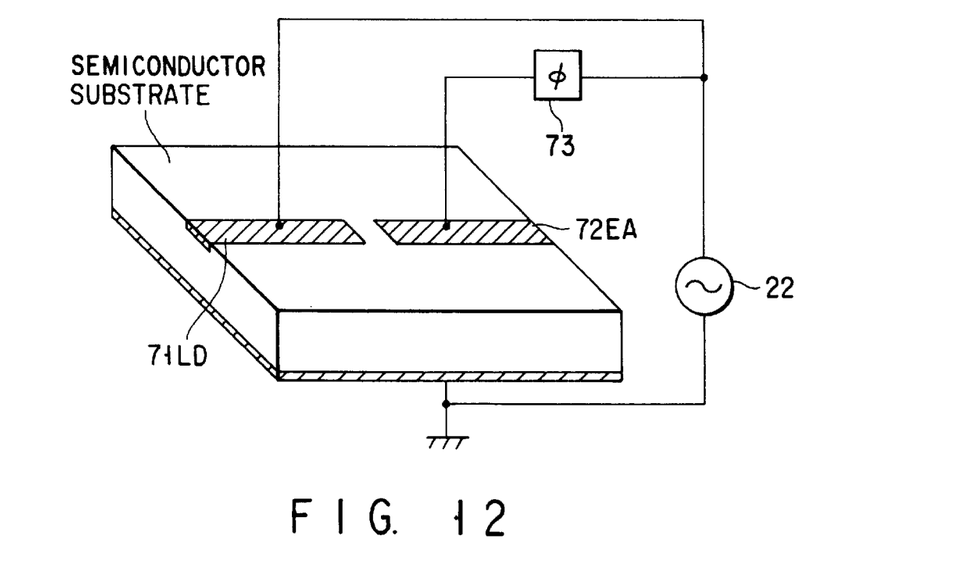
FIG. 12 is a perspective view of the laser diode and the electro-absorption modulator integrated on the same substrate.

As shown in FIG. 12, the laser diode 71 and the electro-absorption modulator 72 may be integrated integrally on the same substrate.

Figure 13:
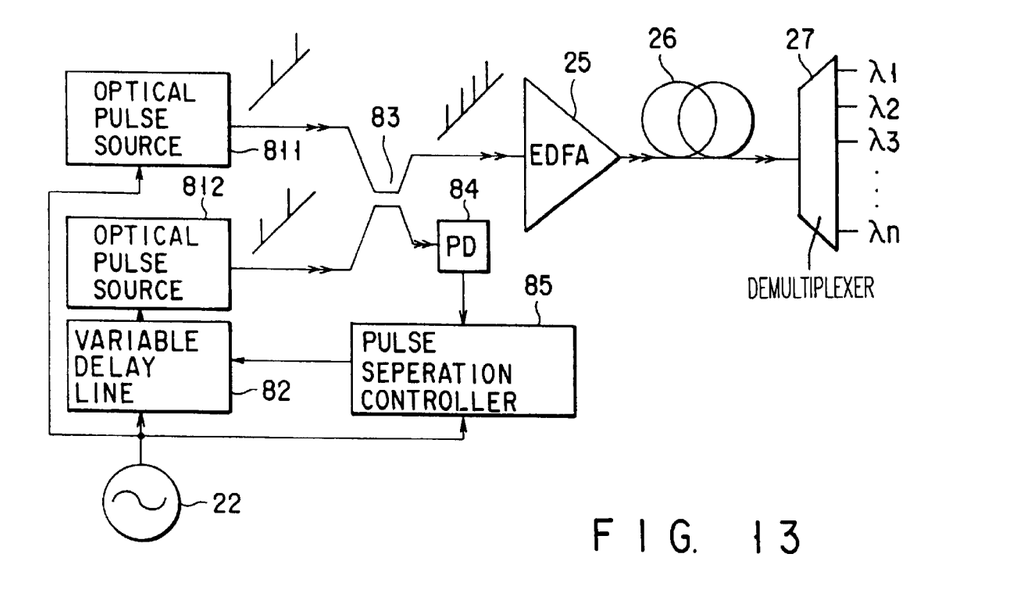
FIG. 13 is a block diagram of a multi-wavelength light source according to an eight embodiment of the present invention.

FIG. 13 shows an eighth embodiment of the multi-wavelength light source according to the present invention. This embodiment is characterized by the existence of redundancy in the optical generating portion. In other respects, this embodiment remains unchanged from the arrangement of FIG. 3. In this figure, therefore, like reference numerals are used to denote corresponding parts to those in FIG. 3 and repeated descriptions thereof are omitted herein.

This multi-wavelength light source is provided with first and second optical pulse generators 811 and 812. The first optical pulse generator 811 is directly subjected to pulse modulation with a frequency signal output from the oscillator 22, while the second optical pulse generator 812 is subjected to pulse modulation with a frequency signal output from the oscillator but delayed by a variable delay circuit 82.

Optical pulse trains output from the first and second generators 811 and 812 are combined and then distributed to two paths by a 3-dB coupler 83. The optical pulse train on one of the paths is sent to the EDFA 25, while the optical pulse train on the other path is sent to a photodetector (PD) 84.

The photodetector 84 is intended to monitor the optical pulse train generation. Its output is sent to a pulse spacing control circuit 85 that detects the pulse spacing from a monitor signal and controls the amount of delay in the variable delay circuit 82 so that the pulse spacing will be held constant.

In the multi-wavelength light source thus arranged, two optical pulse generators 811 and 812 are prepared and their output optical pulse trains are multiplexed together by the 3-dB coupler 83. At this point, it is required to adjust the timing of the two optical pulse trains so that pulses will not overlap each other when they are multiplexed. Overlapping of pulses would cause variations in the output level of the multi-wavelength light source by interference.

The multiplexed optical pulse train is monitored by the photodetector 84 to control the amount of delay in the variable delay circuit 82 and adjust the relative timing of the optical pulse trains so that the frequency component twice the original repetition frequency will be obtained to a maximum. By this operation, each pulse in one optical pulse train can be placed just midway between two successive pulses in the other pulse train.

According to this arrangement, even if one of the optical pulse generators fails, the other optical pulse generator will continue to operate, thus allowing continued generation of optical carriers. This helps improve reliability. In this case, however, the pulse spacing increases, thus lowering the transmission bit rate. Thus, it is required to impose a limit on the bit rate in advance taking failures into consideration.

Figure 14:
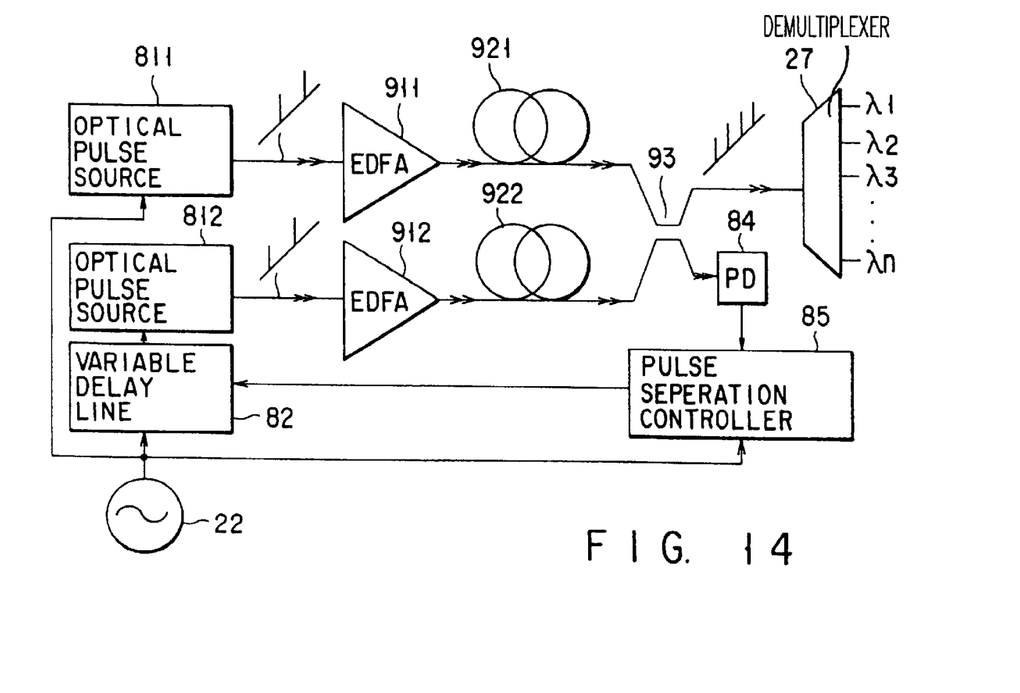
FIG. 14 is a block diagram of a multi-wavelength light source according to a ninth embodiment of the present invention.

FIG. 14 shows a ninth embodiment of the multi-wavelength light source according to the present invention. In this figure, like reference numerals are used to denote corresponding parts to those in FIG. 13 and repeated descriptions thereof are omitted herein.

This multi-wavelength light source is configured to have a redundant EDFA in addition to the redundant pulse generator shown in FIG. 13. That is, optical pulse trains output from the first and second optical pulse generators 811 and 812 are amplified by first and second EDFAs 911 and 912 and then passed through SC fibers 921 and 922, respectively. In the fibers, the optical spectrum is broadened.

The two optical pulse trains thus obtained are combined and distributed to two paths by a 3-dB coupler 93. The optical pulse train on one path is sent to the WDM demultiplexer 27 for demultiplexing into a plurality of optical carriers of different wavelengths. The optical pulse train on the other path is monitored by the photodetector 84, the output signal of which is coupled to the control circuit 85. This control circuit detects the pulse spacing from the monitor output signal and controls the amount of delay in the variable delay circuit 82 so that the pulse spacing will be held constant.

The above arrangement takes redundant configurations for the EDFA as well as the optical pulse generator, further improving reliability. In the arrangement, optical pulse train monitoring is performed on output light of the 3-dB coupler 93 in which the optical outputs of the SC fibers 921 and 922 are multiplexed together. It is also possible to multiplex optical pulse trains before they enter the SC fibers 921 and 922. By so doing, the power will be reduced by coupler insertion loss and the output spectrum width will be decreased correspondingly. Thus, it is preferable that the monitoring be performed on the output sides of the SC fibers 921 and 922 as in the present embodiment.

In the embodiments of the second invention shown in FIGS. 8 through 14, the state of polarization of the SC fiber output is fixed; the polarization dependence problem of the optical modulator arises. The application of the first embodiment to each of the embodiments will solve this problem. In FIGS. 15 through 19, there are illustrated modifications of the respective embodiments shown in FIGS. 8, 9, 10, 13, and 14.

Figure 15:
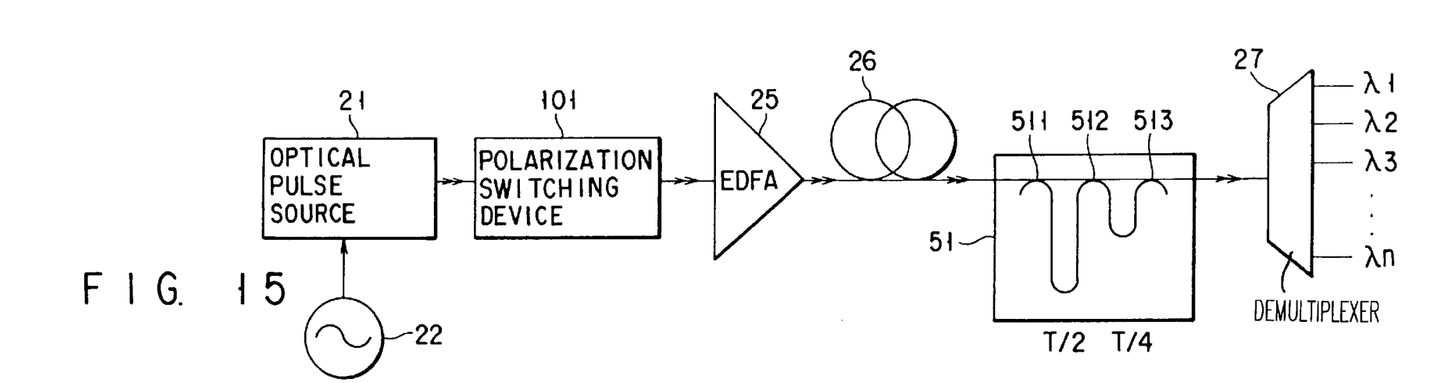
FIG. 15 is a block diagram of a multi-wavelength light source according to a tenth embodiment of the present invention, which has the first embodiment of FIG. 3 and the fifth embodiment of FIG. 8.

FIG. 15 shows a tenth embodiment of the present invention which uses the first embodiment of FIG. 3 and the fifth embodiment of FIG. 8 in combination. The polarization switching unit 101 is interposed between the optical pulse generator 21 and the EDFA 25 so that two successive optical pulses in the optical pulse train are polarized perpendicular to each other and the multiplier 51 is used to increase the pulse repetition frequency by a factor of two, thereby allowing the generation of non-polarized, wideband white pulses at high bit rate.

Figure 16:
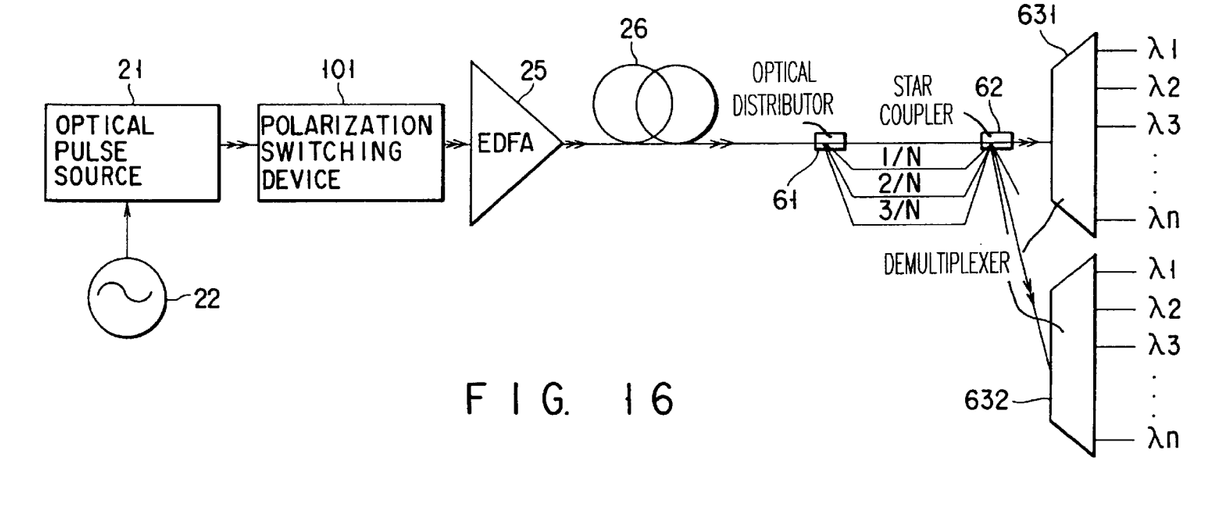
FIG. 16 is a block diagram of a multi-wavelength light source according to an eleventh embodiment of the present invention, which has the first embodiment of FIG. 3 and the sixth embodiment of FIG. 9.

FIG. 16 shows an eleventh embodiment of the present invention, which is implemented by the combined use of the sixth embodiment of FIG. 9 and the first embodiment. In this embodiment, the polarization switching unit 101 interposed between the optical pulse generator 21 and the EDFA 25 switches the direction of polarization of optical pulses in the pulse train so that two successive optical pulses are orthogonally polarized, the one to N optical distributor 61 distributes the optical pulse train to N paths to provide the relative delaying of the optical pulse trains on the N paths by integral multiples of T/N, and the N optical pulse trains thus delayed are multiplexed together by the N to N star coupler 62 to double the pulse repetition frequency, thereby allowing the generation of non-polarized SC pulses at high repetition rate.

Figure 17:
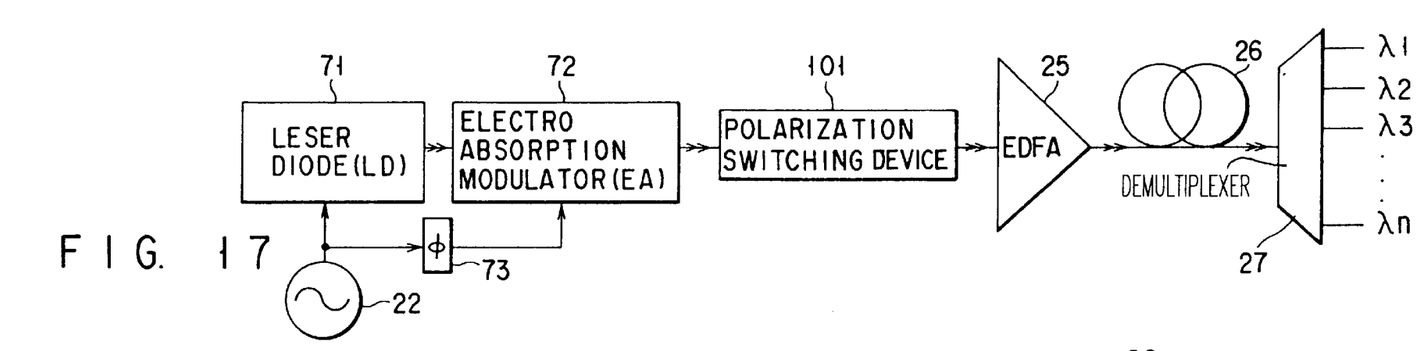
FIG. 17 is a block diagram of a multi-wavelength light source according to a twelfth embodiment of the present invention which uses the first embodiment of FIG. 3 and the seventh embodiment of FIG. 10.

FIG. 17 shows a twelfth embodiment of the present invention which uses the seventh embodiment shown in FIG. 10 and the first embodiment. In this embodiment, the optical pulse train is obtained by direct modulation of the laser diode 71 and subsequent narrowing by the electro-absorption modulator 72 and the resulting pulse train is switched by the polarization switching unit 101 so that successive pulses are orthogonally polarized, thereby allowing the generation of non-polarized SC pulses at high repetition rate.

Figure 18:
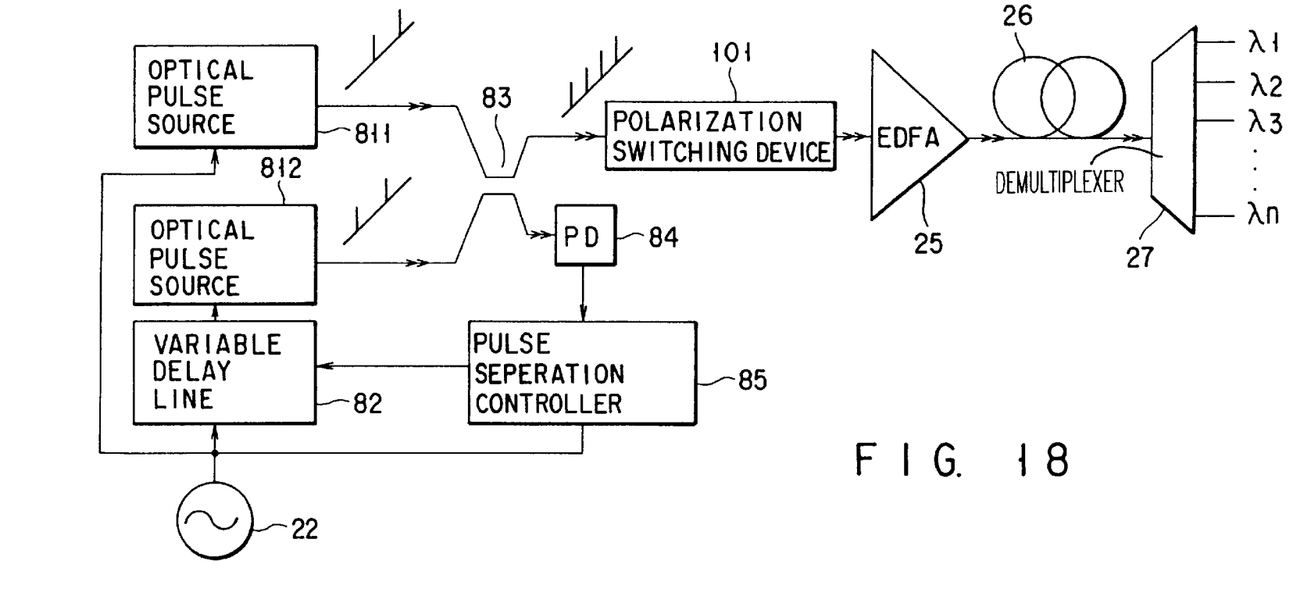
FIG. 18 is a block diagram of a multi-wavelength light source according to a thirteenth embodiment of the present invention, which has the first embodiment of FIG. 3 and the eighth embodiment of FIG. 13.

FIG. 18 shows a thirteenth embodiment of the present invention which uses the eighth embodiment shown in FIG. 13 and the first embodiment. In this embodiment, the optical pulse train outputs of the two optical pulse generators 811 and 812 are multiplexed together by the 3-dB coupler 83 so that each pulse in one pulse train will not overlap or coincide with any pulse in the other pulse train, thereby doubling the number of optical pulses. Further, the direction of polarization of each optical pulse in the multiplexed optical pulse train is switched by the polarization switching unit 101 so that each pulse is orthogonally polarized relative to the next pulse. Thus, the generation of non-polarized SC pulses at high repetition rate can be achieved.

Figure 19:
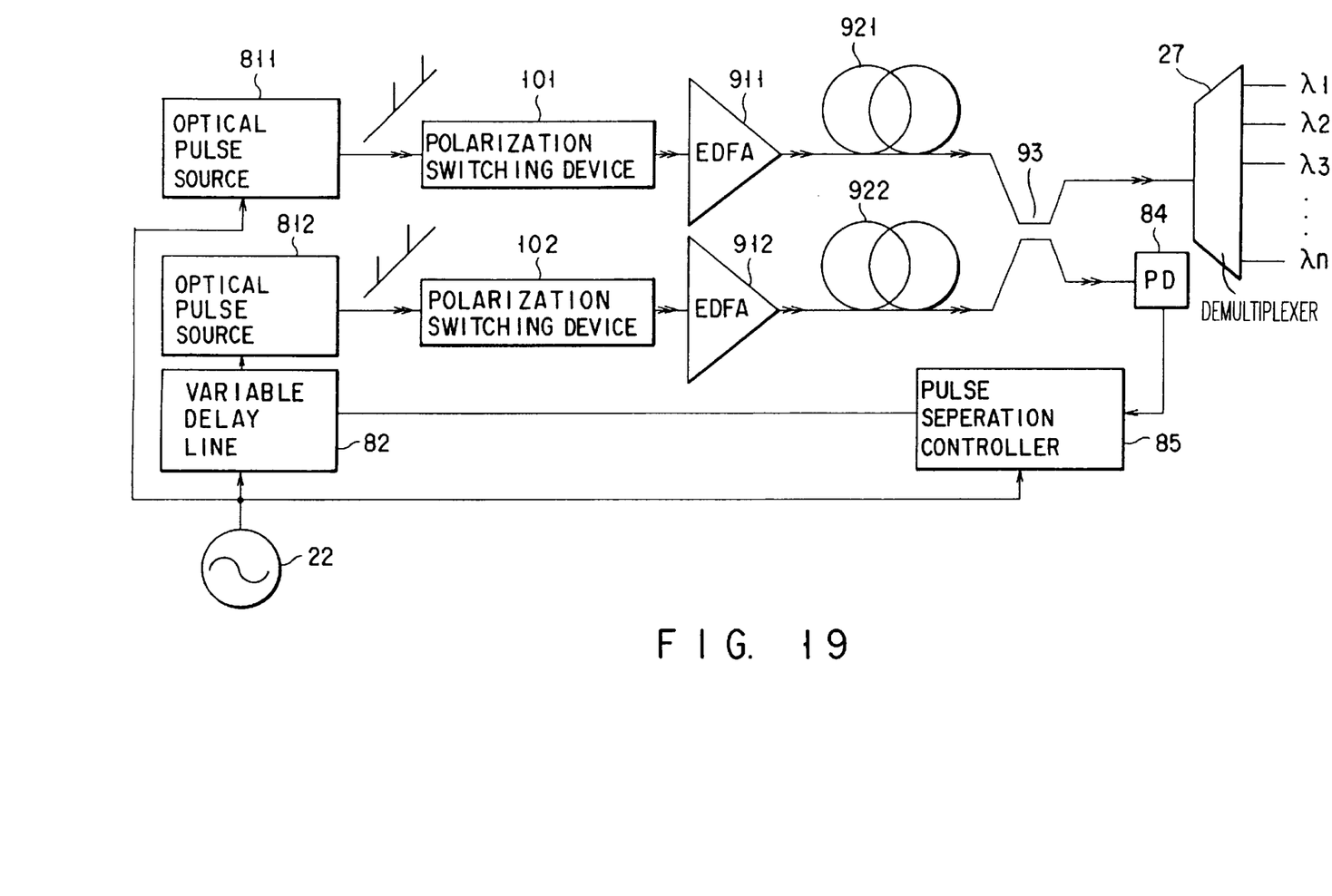
FIG. 19 is a block diagram of a multi-wavelength light source according to a fourteenth embodiment of the present invention, which has the first embodiment of FIG. 3 and the ninth embodiment of FIG. 14.

FIG. 19 shows a fourteenth embodiment of the present invention which uses the ninth embodiment shown in FIG. 14 and the first embodiment. In this embodiment, the optical pulse trains output of the two optical pulse generators 811 and 812 are switched by the polarization switching units 101 and 102, respectively. The resulting pulse trains are amplified by the EDFAs 911 and 912 and then applied to the SC fibers 921 and 922 where their spectra are produced. The optical pulse trains are then combined by the 3-dB coupler 93 so that each pulse in one train will not overlap or coincide with any pulse in the other train and then distributed, thereby allowing the generation of non-polarized SC pulses at high repetition rate.

The polarization switching unit used in each of the tenth through fourteenth embodiments can be configured identically to the arrangements shown in FIGS. 4, 5, 6, and 7A.

Figure 20:
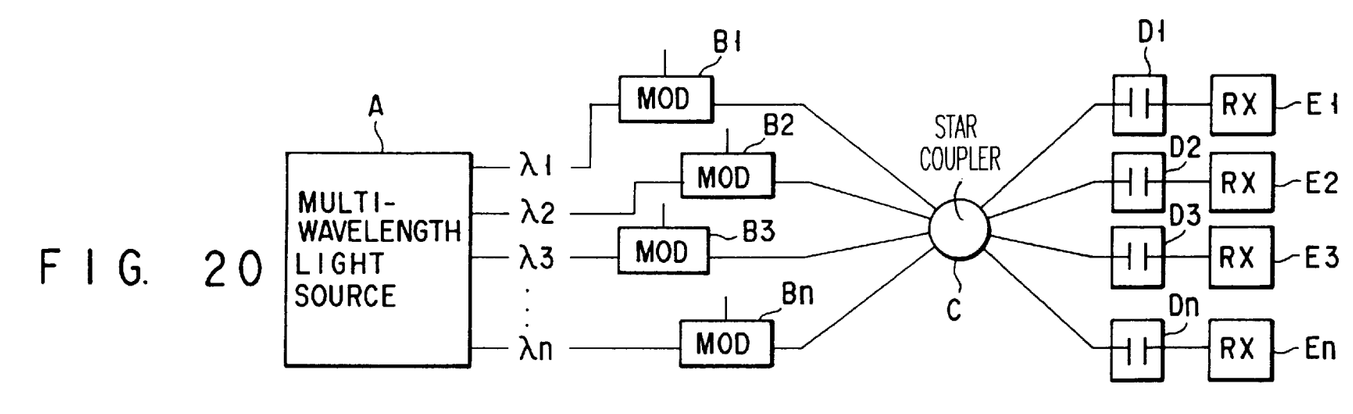
FIG. 20 is a block diagram showing an arrangement of a local area network (LAN) using a multi-wavelength light source according to as a fifteenth embodiment of the present invention.

FIG. 20 shows an arrangement of a local area network (LAN) using a multi-wavelength light source according to the present invention as a fifteenth embodiment. In this figure, A denotes a multi-wavelength light source according to one of the first through fourteenth embodiments. Light carriers λ1 to λn generated by the light source A are supplied to optical modulators B1 to Bn, respectively, within transmission nodes and then modulated with transmit data.

Modulated optical signals are wavelength multiplexed together by a star coupler C and again distributed to m receiver nodes. Each receiver node can select an optical signal of desired wavelength by appropriately tuning its reception by its optical filter Dk and reception by its optical receivers (RX) Ek.

Figure 21:
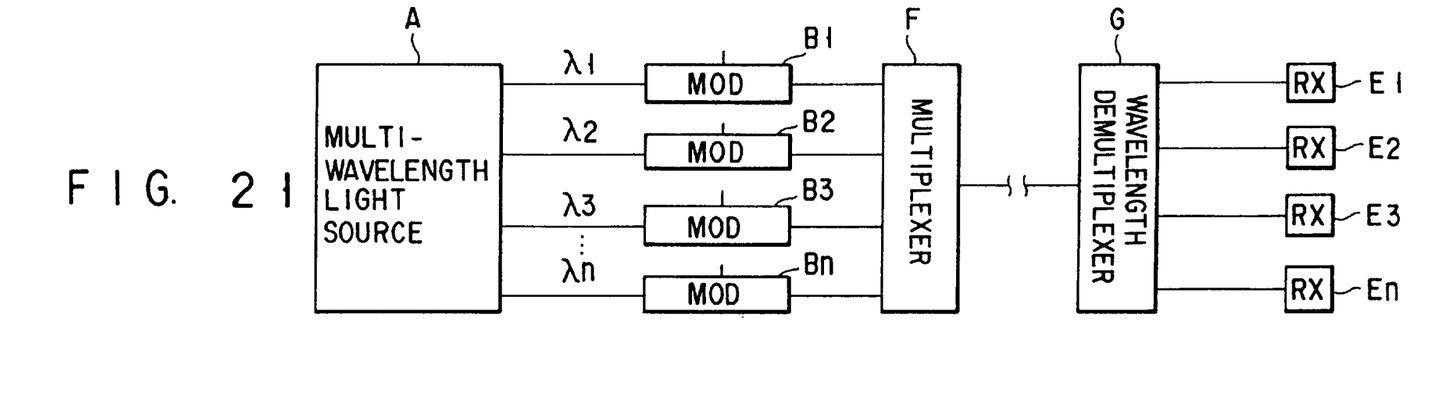
FIG. 21 is block diagram showing an arrangement of a local area network (LAN) using a multi-wavelength light source according to a sixteenth embodiment of the present invention.

As shown in FIG. 21, the present invention may also be applied to point-to-point optical transmission system as a sixteenth embodiment. Each optical carrier produced by the multi-wavelength light source are modulated with data by optical modulators B1 to Bn, and subsequently multiplexed onto a single transmission fiber by the wavelength multiplexer F. At the receiver terminal, the received optical signal is wavelength demultiplexed using the demultiplexer G, and each wavelength channel is individually received using optical receivers E1 to En.

As described above, according to the invention, a multi-wavelength light source can be provided which generates multiple non-polarized, pulse trains of dependent wavelengths by using a simple and low-cost technique. Moreover, one the other hand, a multi-wavelength light source can be provided which permits data transmission at high bit rate to be produced with a simple and low-cost technique. Furthermore, by combining the light sources, a multi-wavelength light source can be provided which allows non-polarized and high-bit-rate transmission.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-wavelength light source comprising:

optical pulse train generating means for generating an optical pulse train;

polarization control means for using said optical pulse train to generate an optical pulse train such that successive optical pulses are polarized orthogonal to each other;

optical amplifier means for amplifying said optical pulse train output from said polarization control means;

optical spectrum broadening means for broadening the optical spectrum of said optical pulse train amplified by said optical amplifier means; and optical wavelength demultiplexing means for demultiplexing said optical pulse train output from said optical spectrum broadening means into components of desired wavelengths.

2. The multi-wavelength light source according to claim 1, wherein said polarization control means comprises a polarization-dependent phase modulator for phase-modulating the light passing through an optical waveguide by applying an electric field to the light waveguide in accordance with a drive signal; an optical pulse train coupling means for coupling an optical pulse train generated by said optical pulse train generating means, to an input port of said optical waveguide such that the optical pulses are polarized at 45 degrees to axes which said optical waveguide has in TE (Transverse Electric) mode and TM (Transverse Magnetic) mode; and switching means for supplying a drive signal to apply a different electric field to said phase modulator for each optical pulse passing through said optical waveguide, thereby to polarize the optical pulses output from said phase modulator, in different directions.

3. The multi-wavelength light source according to claim 1, wherein said polarization control means includes distribution means for distributing said optical pulse train to two paths, delay/polarization plane control means for delaying an optical pulse train on one of said two paths by one-half the pulse period relative to an optical pulse train on the other path and rotating the plane of polarization of each pulse through 90 degrees relative to the other path, and multiplexing means for multiplexing optical pulse trains from said delay/polarization plane control means.

4. The multi-wavelength light source according to claim 1, wherein said polarization control means uses a polarization maintaining fiber having two polarization modes of fast and slow modes and a length that allows the difference in propagation delay between said two modes to be one-half the pulse period of said optical pulse train being directed to said two polarization modes with the same power.

5. The multi-wavelength light source according to claim 1, wherein said optical spectrum broadening means consist of zero dispersion fiber having a nonlinear refractive index.

6. A multi-wavelength light source comprising:

optical pulse train generating means for generating an optical pulse train;

optical amplifier means for amplifying said optical pulse train output from said polarization control means;

optical spectrum broadening means for broadening the optical spectrum of said optical pulse train amplified by said optical amplifier means;

multiplier means for multiplying the pulse repetition frequency of said optical pulse train output from said optical spectrum broadening means;

optical wavelength demultiplexing means for demultiplexing said optical pulse train output from said optical spectrum broadening means into components of desired wavelengths; and polarization control means interposed between said optical pulse train generating means and said optical pulse train generating means and said optical amplifier means for controlling each pulse in said optical pulse train so that two successive optical pulses are polarized perpendicular to each other.

7. The multi-wavelength light source according to claim 6, wherein said multiplying means consists of a repetition of operation of distributing said optical pulse train to two paths, delaying an optical pulse train on one path by one-half the pulse period relative to an optical pulse train on the other path, and multiplexing the two optical pulse trains together.

8. The multi-wavelength light source according to claim 6, wherein said multiplying means distributes said optical pulse train to a number N of paths (where N is a natural number of more than one), delays optical pulse trains on said N paths by 0, T/N, 2T/N, 3T/N, . . . , (N−1)T/N (where T is the pulse period), respectively, and multiplexes said optical pulse trains on said N paths together.

9. The multi-wavelength light source according to claim 8, wherein said multiplying means uses a star coupler for multiplex processing, and said optical wavelength demultiplexing means includes a plurality of wavelength separators to which an optical pulse train output from each said star coupler output port is coupled.

10. A multi-wavelength light source comprising:

a laser diode light source for outputting laser light;

modulation means for directly pulse modulating said laser light source to provide an optical pulse train;

pulse width control means for narrowing the pulse width of each pulse in said optical pulse train output from said laser light source;

an optical amplifier for amplifying said optical pulse train output from said pulse width control means;

spectrum broadening means for broadening the optical spectrum of said optical pulse train amplified by said optical amplifier;

optical wavelength demultiplexing means for demultiplexing said optical pulse train output from said optical spectrum broadening means into components of desired wavelengths; and polarization control means interposed between said optical pulse train generating means and said optical amplifier means for controlling each pulse in said optical pulse train so that two successive optical pulses are polarized orthogonal to each other.

11. The multi-wavelength light source according to claim 10, wherein said pulse width control means uses an electro-absorption modulator which is driven in synchronization with the modulating signal for said laser light source.

12. A multi-wavelength light source comprising:

first and second optical pulse generating means for respectively generating first and second optical pulse trains having the same pulse period;

optical pulse train multiplexing/distribution means for multiplexing said first and second optical pulse trains together and distributing a multiplexed optical pulse train to two paths;

pulse interval control means for monitoring a multiplexed optical pulse train in one of said paths and controlling either one of said first and second optical pulse generating means to prevent pulse overlap;

optical amplifier means for amplifying a multiplexed optical pulse train on the other of said paths;

spectrum broadening means for broadening the optical spectrum of said optical pulse train amplified by said optical amplifier;

optical wavelength demultiplexing means for demultiplexing said optical pulse train output from said optical spectrum broadening means into components of desired wavelengths; and polarization control means followed bv said optical amplifier means for controlling each pulse in said optical pulse train so that two successive optical pulses are polarized orthogonal to each other.

13. A multi-wavelength light source comprising:

first and second optical pulse generating means for respectively generating first and second optical pulse trains having the same pulse period;

first and second optical amplifier means for respectively amplifying said first and second pulse trains;

first and second optical spectrum broadening means for respectively broadening the optical spectra of said optical pulse trains amplified by said first and second optical amplifier means;

optical pulse train multiplexing means for multiplexing said first and second optical pulse trains output from said first and second optical spectrum broadening means and distributing a multiplexed optical pulse train to paths;

pulse interval control means for monitoring a multiplexed optical pulse train on one of said paths and controlling either one of said first and second optical pulse generating means to prevent pulse overlap;

optical wavelength demultiplexing means for demultiplexing a multiplexed optical pulse train on the other path distributed by said optical pulse multiplexing/distributing means into components of desired wavelengths; and polarization control means followed by said optical amplifier means for controlling each pulse in said optical pulse train so that two successive optical pulses are polarized orthogonal to each other.

* * * * *